United States Patent Office 3,413,294
Patented Nov. 26, 1968

3,413,294
TETRAHYDRO-1,4-ETHANO-ISOQUINOLINES
Gordon Northrop Walker, Morristown, N.J., assignor to Ciba Corporation, Summit, N.J., a corporation of Delaware
No Drawing. Continuation-in-part of application Ser. No. 388,722, Aug. 10, 1964. This application May 1, 1967, Ser. No. 634,891
10 Claims. (Cl. 260—286)

ABSTRACT OF THE DISCLOSURE 1,2,3,4-tetrahydro-1,4-ethano-isoquinolines of the formula

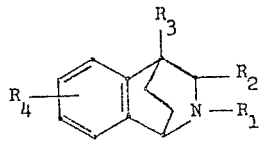

$R_1$=H, aliphatic or araliphatic radical or acyl
$R_2$=H, aliphatic or araliphatic radical
$R_3$=H, aliphatic, araliphatic or aromatic radical
$R_4$=H, alkyl, alkoxy, halogeno, $CF_3$ or amino the N-oxide, quaternaires and salts thereof exhibit diuretic effects.

Cross-references to related applications

This a continuation-in-part of application Ser. No. 388,-722, filed Aug. 10, 1964, which in turn is a continuation-in-part of application Ser. No. 314,494, filed Oct. 7, 1963 (both now abandoned).

Summary of the invention

The present invention concerns and has for its object the provision of new 1,2,3,4-tetrahydro-1,4-ethano-isoquinolines, more particularly those of the Formula I

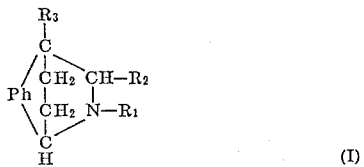

in which $R_1$ stands for hydrogen, an aliphatic or araliphatic hydrocarbon or acyl radical, $R_2$ for hydrogen, an aliphatic or araliphatic radical, $R_3$ for hydrogen, an aliphatic, araliphatic or aromatic radical and Ph for an unsubstituted or substituted 1,2-phenylene radical, the latter is preferably such containing a lower alkyl, lower alkoxy, halogeno, trifluoromethyl or an amino group, the N-oxide and quaternaries thereof and salts of these compounds, as well as corresponding pharmaceutical compositions and methods for the preparation of the new compounds. Said compositions are diuretic, natri- and choriuretic agents lacking kaliureasis, advantageously useful in the treatment of edema due to heart failure or kidney conditions.

Description of the preferred embodiments

The aliphatic radicals $R_1$, $R_2$ and/or $R_3$ represent, for example, lower alkyl, preferably such with up to 4 carbon atoms and at most a tertiary carbon atom, such as methyl, ethyl, n-propyl, isopropyl, n-butyl or isobtuyl, lower alkenyl, such as allyl or methallyl, cycloalkyl or cycloalkyl-lower alkyl having from 3 to 8, preferably from 5 to 6, ring-carbon atoms, such as cyclopropyl, cyclopentyl, cyclohexyl or cycloheptyl; cycloproplymethyl, 1-cyclopropylethyl, cyclopentylmethyl, 3-cyclopentylpropyl, cyclohexylmethyl, 2-cyclohexylethyl or cycloheptyl-methyl, cycloalkenyl or cycloalkenyl-lower alkyl having from 5 to 8, preferably from 5 to 6 ring-carbon atoms, such as 2-cyclopentenyl, 1-cyclohexenyl, 3-cyclohexenyl, 1-cycloheptenyl, 3-cycloheptenyl, or 1-cyclooctenyl; 1-cyclopentenylmethyl, 2-cyclohexenylmethyl or 2-(3-cyclohexenyl)-ethyl.

An araliphatic radical $R_1$, $R_2$ and/or $R_3$ is, for example, monocyclic carbocyclic aryl-lower alkyl, such as $R_4$-phenyl-lower alkyl, e.g. benzyl, 1-phenylethyl or 2-phenylethyl.

An acyl radical $R_1$ preferably stands for lower alkanoyl, such as formyl, acetyl, propionyl or pivalyl.

An aromatic radical $R_3$ is preferably monocyclic carbocyclic aryl, such as $R_4$-phenyl, and the 1,2-phenylene radical Ph preferably stands for $R_4$-1,2-phenylene.

The radical $R_4$ present in the above phenyl or phenylene moieties, represents hydrogen, lower alkyl, such as that mentioned above, lower alkoxy, such as methoxy, ethoxy, n- or i-propoxy or -butoxy, halogeno, such as fluoro, chloro or bromo, trifluoromethyl or amino, preferably di-lower alkylamino, such as dimethylamino or diethylamino.

The quaternaries of the invention are preferably the lower alkyl quaternaries.

The compounds of the invention exhibit valuable pharmacological properties. They show primarily diuretic, natri- and chloriuretic activity and do not cause kaliuresis, which usually accompanies the diuretic, natri- and chloriuretic properties of known diuretic compounds. Said activity can be demonstrated in animal tests using for example mammals, such as rats or dogs, as test objects. Besides their above-mentioned utility, the compounds of the invention are also valuable intermediates in the preparation of other useful products, particularly of pharmacologically active compounds.

Preferred compounds of the invention are those of Formula I, in which $R_1$ stands for hydrogen, alkyl, $R_4$-phenyl-alkyl or alkanoyl, $R_2$ for hydrogen, alkyl or $R_4$-phenyl-alkyl, $R_3$ for hydrogen, alkyl, $R_4$-phenyl-alkyl or $R_4$-phenyl, Ph for $R_4$-1,2-phenylene and $R_4$ for hydrogen, alkyl, alkoxy, halogeno, trifluoromethyl or dialkylamino, in which compounds alkyl, alkanoyl and alkoxy contain up to 4 carbon atoms and at most one tertiary carbon atom, the N-oxide or lower alkyl quaternaires thereof and acid addition salts of these compounds.

Particularly useful are compounds of the Formula II

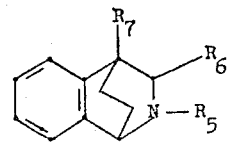

II in which $R_5$ stands for hydrogen, methyl or acetyl, $R_6$ for hydrogen or methyl and $R_7$ for methyl or phenyl, their methyl quaternaries and therapeutically useful acid addition salts which, when given orally to dogs at doses between about 1 and 10 mg./kg./day, or to rats at doses between about 25 and 75 mg./kg./day, show outstanding diuretic, natri- and chloriuretic effects.

The compounds of the invention are advantageously prepared by
(a) Reducing a corresponding 1,4-dihydro-1,4-ethano-isoquinoline or
(b) Reducing a corresponding 1,2,3,4-tetrahydro-1,4-ethanoisoquinoline-3-one or
(c) Reductively condensing a mono- or bis-oxime of a 4-$R_2$-carbonyl - 4-$R_3$-1,2,3,4 - tetrahydro-naphthalene-1-one and, if desired, converting any resulting compound into another compound of the invention.

The reduction according to processes (a), (b) and (c) is advantageously carried out with complex light metal hydrides, such as alkali or alkaline earth metal borohydrides, e.g. sodium, potassium or calcium borohydryde, which are preferably used in reduction (a), or alkali or alkaline earth metal aluminum hydrides, e.g. lithium, sodium or magnesium aluminum hydride, which are preferably used in reduction (b), or catalytically activated or nascent hydrogen, for example, hydrogen in the presence of platinum, palladium or nickel catalysts, e.g. palladium or charcoal, platinum black or Raney nickel, or electrolytically generated hydrogen, which preferably is used in the reductive condensation according to process (c).

The compounds of the invention so-obtained may be converted into each other according to known methods. For example, in a resulting 2-unsubstituted compound a substituent can be introduced according to known methods, for example, by reaction with about 1 molar equivalent of a reactive functional derivative of an alcohol or acid, such as the ester of an aliphatic or araliphatic alcohol with a strong inorganic acid e.g. hydrochloric, hydrobromic, hydroiodic or sulfuric acid or a sulfonic acid, e.g. methane, ethane or p-toluene sulfonic acid, or an acid halide or anhydride, in order to obtain the corresponding 2-substituted derivatives. 2- or N-substitution may also be performed with formaldehyde in the presence of a reducing agent, such as formic acid or catalytically activated hydrogen. Resulting N-acylated compounds may be hydrolyzed with the use of acidic or alkaline hydrolyzing agents or reduced, for example with a complex light metal hydride, such as lithium aluminum hydride, in order to obtain the compounds of Formula I in which $R_1$ stands for hydrogen or an aliphatic or araliphatic hydrocarbon radical. Resulting tertiary amines may be converted into the N-oxides for example by reaction with a peracid, such as persulfuric, peracetic, perbenzoic or monoperphthalic acid, or converted into quaternaries, for example, by reaction of a reactive ester of an alcohol, preferably a lower alkyl halide, such as methyl iodide or ethyl chloride.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g., formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is new and described in co-pending application Ser. No. 388,690, filed Aug. 10, 1964 and now abandoned. Thus, the starting material used in reaction (a) is obtained analogous to reaction (c), however under milder reductive conditions and, if desired, the resulting 2-unsubstituted 1,4-dihydro-1,4-ethano-isoquinoline may be quaternized as shown above. The starting material used in reaction (b) is obtained either by reductively condensing the oxime of a 1-$R_2$-4-oxo-1,2,3,4-tetrahydro-naphthalene-carboxylic acid ester or according to the process of co-pending application Ser. No. 468,992, filed July 1, 1965 and now U.S. Patent No. 3,324,136, by reacting a 1-$R_2$-1,2,3,4-tetrahydro-naphthalene-carboxylic acid amide or nitrile with a mixture of an unsubstituted or N-substituted formamide, ammonium formiate and formic acid. The starting material used in reaction (c) is obtained by hydrolyzing a 4-phenyl-4-$R_3$-4-$R_2$-carbonyl-butyronitrile and condensing the resulting acid, advantageously under the reaction conditions, i.e. in the presence of sulfuric acid, to the 4-$R_2$-carbonyl-4-$R_3$-1,2,3,4-tetrahydro-naphthalene-1-one. The latter is reacted either under mild or vigorous conditions with hydroxylamine in order to obtain the mono- or bisoxime thereof.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

Example 1

To the solution of 4.0 g. 3-methyl-4-phenyl-1,4-dihydro-1,4-ethano-isoquinoline in 200 ml. methanol, 15 g. of sodium borohydride are added. After the initial reaction subsides, the mixture is refluxed for 2¼ hours, then evaporated to about half of its volume and diluted with cold water. The precipitate formed is filtered off, washed with water and diethyl ether and recrystallized from diethyl ether to yield the 3-methyl-4-phenyl-1,2,3,4-tetrahydro-1,4-ethano-isoquinoline hemihydrate of the formula

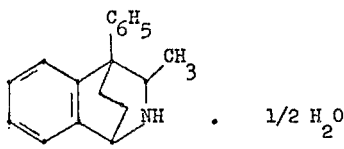 . 1/2 H$_2$O melting at 180–181°.

The starting material is prepared as follows: To the mixture of 105.0 g. 1,1-diphenylacetone, 300 ml. tetrahydrofuran and 15 ml. of a 40% solution of benzyl trimethylammonium methoxide in methanol, 26.5 g. acrylonitrile in 100 ml. tetrahydrofuran are added during 20 minutes at 25–30°. It is allowed to stand at room temperature for 1½ hours, then chilled, acidified with diluted hydrochloric acid and poured onto ice. The precipitate is filtered off and washed with water. It is triturated with diethyl ether to yield the 4-acetyl-4,4-diphenyl-butyronitrile, which melts after recrystallization from ethanol at 117–118°. The mixture of 130.0 g. thereof, 800 ml. glacial acetic acid and 800 ml. concentrated hydrochloric acid is refluxed for 4½ hours. It is concentrated, cooled, poured into 3 l. ice water, the precipitate collected, washed with water and recrystallized from ethanol to yield the 4-acetyl-4,4-diphenyl-butyric acid, M.P. 142.5°.

95.0 g. thereof are added in small portions to 800 ml. concentrated sulfuric acid while stirring. The addition is completed after 1½ hours; occasional external cooling is necessary to prevent the temperature rise above 30–40°. The deep-red solution is stirred at room temperature for another four to five hours and is then poured onto about 4000 g. chopped ice. The organic material is extracted with diethyl ether, the extract washed with water, aqueous sodium hydroxide and again with water, dried and evaporated to yield the crystalline 4-acetyl-4-phenyl-1,2,3,4-tetrahydro-naphthalen-1-one melting after recrystallization from diethyl ether at 106–108°.

The solution of 2.0 g. thereof and 5.0 g. hydroxylamine hydrochloride in 20 ml. water, 40 ml. ethanol and 10 ml. 20% aqueous sodium hydroxide, is refluxed for ten minutes, and then chilled in an ice bath. A small amount of ice is added whereupon a crystalline material separates. It is collected, washed with water and recrystallized from ethanol to yield the 4-acetyl-1-hydroxyimino-4-phenyl-1,2,3,4-tetrahydro-naphthalene melting at 171–172°.

The solution of 2.8 g. thereof in 300 ml. ethanol is hydrogenated at about 3½ atmospheres in the presence of 1.0 g. 10% palladium on charcoal while heating to 60° and shaking. After three hours, the pressure has dropped about 0.1 atmosphere and the mixture is filtered. The filtrate is evaporated, the residue triturated with diethyl ether and recrystallized from ethanol-diethyl ether to yield the 3-methyl-4-phenyl-1,4-dihydro-1,4-ethano-isoquinoline melting at 135–136° after drying under reduced pressure.

Example 2

To 6.5 g. 2,3-dimethyl-4-phenyl-1,4-dihydro-1,4-ethano-isoquinolinium iodide in 300 ml. methanol, 20 g. sodium borohydride are added in portions. The mixture is then refluxed for 2 hours, evaporated to a volume of about 100 ml. and treated with 1000 ml. cold water. An oil separates, which crystallizes on standing. It is filtered off, washed with water and recrystallized from diethyl ether to yield the 2,3 - dimethyl - 4 - phenyl - 1,2,3,4 - tetrahydro - 1,4 - ethano-isoquinoline of the formula

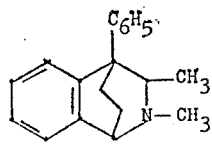

melting at 90–92°.

1 g. thereof is dissolved in the minimum amount of diethyl ether and the solution acidified with ethanolic hydrogen chloride to yield the corresponding hydrochloride melting at 303.5–305° (with decomposition).

The starting material is prepared as follows: The mixture of 7.5 g. 3-methyl-4-phenyl-1,4-dihydro-1,4-ethano-isoquinoline and 25 ml. methyl iodide in 150 ml. methanol is refluxed for 5½ hours. The major portion of the solvent is evaporated. The residue is filtered off, washed with methanol and recrystallized from methanol to yield the 2,3 - dimethyl - 4 - phenyl - 1,4 - dihydro - 1,4 - ethano - isoquinolinium iodide melting at 242–244° (with decomposition).

Example 3

Upon refluxing 1.0 g. 3-methyl-4-phenyl-1,2,3,4-tetrahydro-1,4-ethano-isoquinoline in 50 ml. acetic acid anhydride for two hours and evaporating the excess of acetic acid anhydride, the 2-acetyl-3-methyl-4-phenyl-1,2,3,4-tetrahydro-1,4-ethano-isoquinoline of the formula

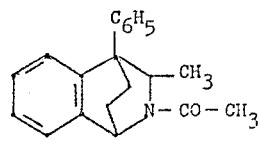

is obtained. It melts after recrystallization from diethyl ether at 174–176°.

Example 4

To 0.2 g. lithium aluminum hydride in 20 ml. tetrahydrofuran, 0.5 g. 2-acetyl-3-methyl-4-phenyl-1,4-ethano-1,2,3,4-tetrahydro-isoquinoline in 20 ml. tetrahydrofuran are added. After refluxing for two hours, the reaction mixture is treated with 0.8 ml. ethyl acetate, 0.3 ml. water, 0.6 ml. 15% aqueous sodium hydroxide, and 0.8 ml. ethyl acetate. The resulting precipitate is filtered off and the filtrate evaporated to yield the 2-ethyl-3-methyl-4-phenyl-1,2,3,4-tetrahydro-1,4-ethano-isoquinoline of the formula

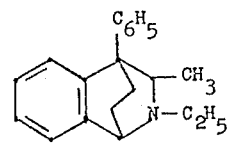

Example 5

The mixture of 5.0 g. 4-acetyl-4-phenyl-1,2,3,4-tetrahydro-naphthalene-1-one-dioxime, 2.0 g. 10% palladium-on-charcoal and 300 ml. ethanol is hydrogenated at about 3½ atmospheres and at 60°. After five hours, the catalyst is filtered off, and the filtrate evaporated under reduced pressure. The residue is triturated with diethyl ether to yield a minor amount of 3-methyl-4-phenyl-1,4-dihydro-1,4-ethano-isoquinoline, M.P. 132–134°. The mother liquors, when treated with a solution of hydrogen chloride in diethyl ether and then with acetone, yield a major amount of the crystalline 3-methyl-4-phenyl-1,2,3,4-tetrahydro-1,4-ethano-isoquinoline hydrochloride, melting at 296–298° (with decomposition) after recrystallization from ethanol-acetone. It is identical with hydrochloride obtained from the compound obtained according to Example 1.

The starting material is prepared as follows: The mixture of 14.2 g. 4-acetyl-4-phenyl-1,2,3,4-tetrahydro-naphthalen-1-one, 33.0 g. hydroxylamine hydrochloride, 200 ml. ethanol, 135 ml. water and 65 ml. 20% aqueous sodium hydroxide is refluxed for 2½ hours. Upon cooling the precipitate formed is filtered off, washed with water and dried to yield the 4-acetyl-4-phenyl-1,2,3,4 tetrahydro-naphthalen-1-one dioxime melting at 221-222° after recrystallization from ethanol.

Example 6

The ethanolic solution of 2,3-dimethyl-4-phenyl-1,2,3,4-tetrahydro-1,4-ethano-isoquinoline, when reacted with a saturated solution of picric acid in ethanol, yields the 2,3-dimethyl - 4 - phenyl - 1,2,3,4 - tetrahydro - 1,4 - ethano - isoquinoline picrate, which melts at 219.5–221° after recrystallization from ethanol.

Example 7

The mixture of 1.0 g. 2,3-dimethyl-4-phenyl-1,2,3,4-tetrahydro-1,4-ethano-isoquinoline, 18 ml. methyl iodide and 200 ml. methanol is refluxed for six hours. It is then evaporated under reduced pressure, the residue triturated with diethyl ether and recrystallized from methanol to yield 2,2,3 - trimethyl - 4 - phenyl - 1,2,3,4 - tetrahydro - 1,4-ethano-isoquinolinium iodide of the formula

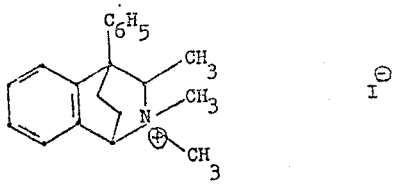

melting at 259–262° (with decomposition).

Example 8

To the solution of 2.1 g. 2-methyl-4-phenyl-1,2,3,4-tetrahydro-1,4-ethano-isoquinoline-3-one in 150 ml. toluene the mixture of 1.3 g. lithium aluminum hydride, 100 ml. tetrahydrofuran and 3.4 ml. diethyl ether is added and the whole heated for two hours until the temperature reaches 90°. It is then refluxed for 2¾ hours and allowed to stand at room temperature for three days. The mixture is chilled, treated with water and diluted acetic acid, filtered and the filtrate basified with potassium carbonate. It is extracted with diethyl ether, the extract washed with water, dried and evaporated to yield the 2-methyl - 4 - phenyl - 1,2,3,4 - tetrahydro - 1,4 - ethano - isoquinoline hemihydrate of the formula

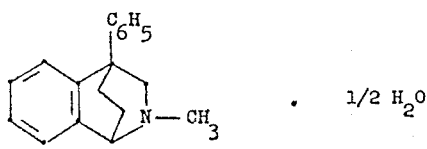

melting at 205–215° (with decomposition) after recrystallization from diethyl ether.

The hydrochloride thereof is prepared by treating its diethyl ether solution with ethanolic hydrogen chloride and recrystallizing the precipitate from ethanol-diethyl ether, M.P. 272–275° (with decomposition).

The starting material used is prepared as follows: To the mixture of 193.0 g. diphenylacetonitrile, 30 ml. of a 40% solution of benzyl-trimethyl-ammonium methoxide in methanol and 400 ml. tetrahydrofuran 53.0 g. acrylonitrile in 100 ml. tetrahydrofuran are added over a period of 15 minutes while maintaining the temperature at 20° or below. The mixture is allowed to stand for 1½ hours, it is then treated with a mixture of ice and hydrochloric acid and extracted with diethyl ether. The extract is washed with diluted aqueous sodium hydroxide and water, dried and concentrated to a volume of about 250 ml. Upon cooling to 0° the α,α-diphenyl-glutaronitrile precipitates; a sample, recrystallized from diethyl ether, melts at 73–74.5°.

The mixture of 98.0 g. thereof and the solution of 545.0 g. potassium hydroxide in 660 ml. water is refluxed at 100–110° for four days while stirring occasionally. The cold solution is then acidified, the resulting α,α-diphenyl-glutaric acid is filtered off, washed with water and recrystallized from ethyl acetate M.P. 199–200.5°.

95.0 g. thereof are stirred into 1800 ml. concentrated sulfuric acid over a period of ten minutes. The deep red solution obtained is stirred for two hours and allowed to stand overnight at room temperature. It is then poured over ice, the mixture extracted with diethyl ether, the extract washed with water, dried, filtered and evaporated. The residue is recrystallized from diethyl ether to yield the 4 - phenyl - 1,2,3,4 - tetrahydro - naphthalen - 1 - one - 4-carboxylic acid melting at 161.5–163°.

The mixture of 50.0 g. thereof 140 ml. concentrated sulfuric acid, 10 ml. fuming sulfuric acid (containing 30% sulfur trioxide) and 3000 ml. absolute ethanol is refluxed for 18 hours. The solvent is distilled off, the residue cooled and treated with ice. The mixture is extracted with diethyl ether, the extract washed with water, sodium hydroxide and again with water, dried, filtered and evaporated. The residue is recrystallized from diethyl ether to yield the ethyl 4-phenyl-1,2,3,4-tetrahydro-naphthalen-1-one-4-carboxylate melting at 89.5–91°.

The solution of 19.0 g. thereof ethanol is treated with the solution prepared from 48.0 g. hydroxylamine hydrochloride and 19.0 g. sodium hydroxide in 285 ml. water while cooling. The mixture is refluxed for 10 minutes and extracted with diethyl ether. The extract is washed with water, dried, evaporated and the residue recrystallized from aqueous ethanol to yield the ethyl 1-hydroxyimino-4-phenyl-1,2,3,4-tetrahydro-naphthalene - 4 - carboxylate melting at 136–138° C.

The mixture of 24.4 g. thereof and 15 g. Raney nickel in 200 ml. ethanol is hydrogenated at an initial pressure of about 2½ atmospheres, first at room temperature, and after one hour at 60°. After the uptake of 2.06 molar equivalents of hydrogen, the catalyst is filtered off, the filtrate evaporated to yield a clear oil having basic properties and representing the ethyl 1-amino-4-phenyl-1,2,3,4-tetrahydro-naphthalene-4-carboxylate. Upon standing at room temperature it deposits crystals which are triturated with diethyl ether and recrystallized from methanol to yield 4 - phenyl-1,2,3,4-tetrahydro-1,4-ethano-isoquinolin-3-one melting at 267.5–269°.

The suspension of 7.1 g. thereof, 3.5 g. sodium hydride (in the form of a 53% suspension in mineral oil) and 500 ml. toluene is refluxed and stirred for ½ an hour. After cooling, 30 ml. methyl iodide are added and refluxing is continued for 10 hours while stirring. The cold mixture is filtered, the filtrate diluted with diethyl ether, washed with water, dried, filtered and evaporated. The residue is triturated with diethyl ether and recrystallized from ethyl acetate-methanol to yield the 2-methyl-4-phenyl-1,2,3,4-tetrahydro-1,4-ethano-isoquinoline - 3 - one melting at 198.5–201.5°.

Example 9

By refluxing the solution of 1 g. 2-methyl-4-phenyl-1,2,3,4-tetrahydro-1,4-ethano-isoquinoline in 20 ml. ethanol in the presence of 2 ml. methyl iodide, the 2-methyl-4-phenyl-1,2,3,4-tetrahydro-1,4-ethano - isoquinoline methiodide of the formula

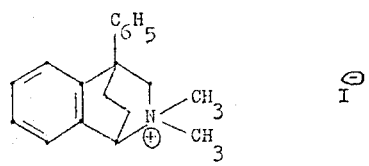

melting at 237–239° after recrystallization from a mixture of ethanol and diethyl ether and drying at 80° under reduced pressure, is obtained.

Example 10

The solution of 4.5 g. 4-acetyl-4-methyl-1,2,3,4-naphthalen-1-one dioxime in 300 ml. ethanol is hydrogenated in the presence of 1.5 g. 10% palladium-on-charcoal at an initial pressure of about 3½ atmospheres. After the absorption of about 2.8 molar equivalents in about 4½ hours, the catalyst is filtered off and the filtrate evaporated to yield the crude 3,4-dimethyl-1,2,3,4-tetrahydro-1,4-ethano-isoquinoline.

It is treated with an excess of methyl iodide in ethanol, the mixture kept on the steam bath for 15 minutes and then evaporated to yield the 2,3,4-trimethyl-1,2,3,4-tetrahydro-1,4-ethano-isoquinoline hydriodide of the formula

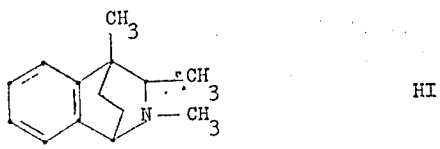 HI which melts, after recrystallization from ethanol-diethyl ether, at 258–259° (with decomposition).

The starting material used is prepared as follows: The solution of 122.0 g. phenylacetone in 400 ml. dry diethyl ether is added over a period of 15 minutes to a stirred, ice chilled suspension of sodium methoxide, prepared from 23.0 g. sodium, in 300 ml. diethyl ether. After 20 minutes 128.0 ml. methyl iodide are added over a period of 15 minutes. The ice-bath is then removed, and the reaction mixture is stirred for 6 hours. The precipitate formed is filtered off, the filtrate washed with water, dried and evaporated, to yield the 3-phenyl-2-butanone, which is used without further purification (its semicarbazone melts at 175–176° after recrystallization from ethanol).

The solution of all but about 1.0 g. thereof in 500 ml. tetrahydrofuran is cooled to 20°, and treated with 30 ml. of a 40% solution of benzyl-trimethyl-ammonium methoxide in methanol and then over a period of 15 minutes with a solution of 47.6 g. acrylonitrile in 100 ml. tetrahydrofuran, while keeping the temperature at 20–30° by cooling, if necessary. After standing at room temperature for 2 hours, the reaction mixture is treated with diluted hydrochloric acid, ice and water. It is extracted with diethyl ether, the extract dried and evaporated to yield the γ-acetyl-γ-phenyl-valeronitrile, which is used without further purification.

The solution of the whole amount obtained thereof, in 2200 ml. of a 1:1-mixture of concentrated hydrochloric acid and glacial acetic acid is refluxed for 3 hours. A portion of the solvent is distilled off, the residue treated with ice and water, and extracted with diethyl ether. The extract is washed with water and diluted aqueous potassium hydroxide. The basic solution is acidified with hydrochloric acid, extracted with diethyl ether, the extract washed with water, dried and evaporated to yield the crude γ-acetyl-γ-phenyl-butyric acid. It is purified by distillation and collected at 174–176.5°/0.6 mm. Hg. It crystallizes and melts after recrystallization from diethyl ether at 73–74°.

The solution of 25.0 g. thereof in 500 ml. concentrated sulfuric acid is allowed to stand overnight at room temperature, and is then poured onto ice. The mixture is extracted with diethyl ether, the extract washed with diluted aqueous potassium hydroxide and dried to yield the 4-acetyl-4-methyl-1,2,3,4-tetrahydro-naphthalen-1-one as a pale-yellow oil, which is used without further purification.

The solution of 14.4 g. thereof in 240 ml. ethanol is treated with the solution of 51.0 g. hydroxylamine hydrochloride and 18.0 g. sodium hydroxide in 360 ml. water. After refluxing for 15 minutes, and cooling, the resulting 4-acetyl-4-methyl-1,2,3,4-tetrahydro-naphthalen-1-one dioxime is filtered off, washed with aqueous ethanol and air-dried; it melts at 224–226° after recrystallization from ethanol.

Analogously are prepared:

Example 11

| Starting materials | Reagents | Products |
|---|---|---|
| 3-methyl-1,4-dihydro-1,4-ethano-isoquinoline. | Sodium borohydride. | 3-methyl-1,2,3,4-tetrahydro-1,4-ethano-isoquinoline. |
| 3-methyl-4-(4-methylphenyl)-1,4-dihydro-1,4-ethano-isoquinoline. | ___do___ | 3-methyl-4-(4-methylphenyl)-1,2,3,4-tetrahydro-1,4-ethano-isoquinoline. |
| 7-chloro-4-(4-chlorophenyl)-3-methyl-1,4-dihydro-1,4-ethano-isoquinoline. | ___do___ | 7-chloro-4-(4-chlorophenyl)-3-methyl-1,2,3,4-tetrahydro-1,4-ethano-isoquinoline. |
| 3-benzyl-7-methoxy-4-phenyl-1,4-dihydro-1,4-ethano-isoquinoline. | ___do___ | 3-benzyl-7-methoxy-4-phenyl-1,2,3,4-tetrahydro-1,4-ethano-isoquinoline. |
| 4-benzyl-3,6,7-trimethyl-1,4-dihydro-1,4-ethano-isoquinoline. | ___do___ | 4-benzyl-3,6,7-trimethyl-1,2,3,4-tetrahydro-1,4-ethano-isoquinoline. |
| 2-ethyl-3-methyl-4-phenyl-1,4-dihydro-1,4-ethano-isoquinolinium bromide. | ___do___ | 2-ethyl-3-methyl-4-phenyl-1,2,3,4-tetrahydro-1,4-ethano-isoquinoline. |
| 2-benzyl-3-methyl-4-phenyl-1,4-dihydro-1,4-ethano-isoquinolinium bromide. | ___do___ | 2-benzyl-3-methyl-4-phenyl-1,2,3,4-tetrahydro-1,4-ethano-isoquinoline. |
| 2,3-dimethyl-1,4-dihydro-1,4-ethano-isoquinolinium bromide. | ___do___ | 2,3-dimethyl-1,2,3,4-tetrahydro-1,4-ethano-isoquinoline. |
| 2,3-dimethyl-4-(4-methylphenyl)-1,4-dihydro-1,4-ethano-isoquinolinium p-toluene sulfonate. | ___do___ | 2,3-dimethyl-4-(4-methylphenyl)-1,2,3,4-tetrahydro-1,4 ethano isoquinoline. |
| 3,4-diethyl-2-methyl-1,4-dihydro-1,4-ethano-isoquinolinium iodide. | ___do___ | 3,4-diethyl-2-methyl-1,2,3,4-tetrahydro-1,4-ethano-isoquinoline. |
| 2-ethyl-4-(4-methoxyphenyl)-3-phenyl-1,4-dihydro-1,4-ethano-isoquinolinium bromide. | ___do___ | 2-ethyl-4-(4-methoxyphenyl)-3-phenyl-1,2,3,4-tetrahydro-1,4-ethano-isoquinoline. |
| 7-chloro-4-(4-chlorophenyl)2-3-dimethyl-1,4-dihydro-1,4-ethano-isoquinolinium iodide. | ___do___ | 7-chloro-4-(4-chlorophenyl)2,3-dimethyl-1,2,3,4-tetrahydro-1,4-ethano-isoquinoline. |
| 3-benzyl-2-methyl-7-methoxy-4-phenyl-1,4-dihydro-1,4-ethano-isoquinolinium methyl sulfate. | ___do___ | 3-benzyl-2-methyl-7-methoxy-4-phenyl-1,2,3,4-tetrahydro 1,4-ethano-isoquinoline. |
| 4-benzyl-2,3,6,7-tetramethyl-1,4-dihydro-1,4-ethano-isoquinolinium iodide. | ___do___ | 4-benzyl-2,3,5,7-tetramethyl-1,2,3,4-tetrahydro-1,4-ethano-isoquinoline. |

Example 12

Pharmaceutical compositions consist essentially of a pharmacologically effective amount of a 1,2,3,4-tetrahydro-1,4-ethano-isoquinoline compound of this invention, a salt, an N-oxide, a salt of an N-oxide or a quaternary ammonium compound thereof, as the pharmacologically effective ingredient together with a pharmaceutically acceptable carrier.

For example, capsules, each containing 0.1 g. of 2,3-dimethyl-4-phenyl-1,2,3,4-tetrahydro - 1,4 - ethano-isoquinoline as the pharmacologically active ingredient, are prepared as follows (for 10,000 capsules).

Ingredients: Grams
  2,3-dimethyl-4-phenyl - 1,2,3,4 - tetrahydro-1,4-ethano-isoquinoline _____ 1,000.0
  Lactose, U.S.P. _____ 2,500.0

The lactose is placed in a suitable mixer, the 2,3-dimethyl-4-phenyl-1,2,3,4-tetrahydro - 1,4 - ethano-isoquinoline is added, and the mixture is agitated until the powders are homogeneously distributed. Portions of 0.350 g. of the resulting mixture are filled into No. 1 gelatine capsules.

Capsules, each containing 0.1 g. of 3-methyl-4-phenyl-1,2,3,4-tetrahydro-1,4-ethano-isoquinoline hydrochloride as the pharmacologically active ingredient, are prepared as follows (for 5,000 capsules).

Ingredients: Grams
  3-methyl - 4 - phenyl-1,2,3,4-tetrahydro-1,4-ethano-isoquinoline hydrochloride _____ 500.0
  Lactose, U.S.P. _____ 1,250.0

The capsules are prepared as described above.

Example 13

Analogous to the method described in Examples 1 and 2 the following starting materials:

| | M.P., deg. (dec.) |
|---|---|
| (a) 2-n-butyl - 3 - methyl-4-phenyl-1,4-dihydro-1,4-ethano-isoquinolinium iodide | 210–212 |
| (b) 2 - benzyl-3-methyl-4-phenyl-1,4-ethano-isoquinolinium chloride hemihydrate | 231–233 |
| (c) 2-(2-phenylethyl)-3-methyl - 4 - phenyl-1,4-ethano-isoquinolinium iodide | 215.5–216.5 |
| (d) 2-allyl - 3 - methyl-4-phenyl-1,4-dihydro-1,4-ethano-isoquinolinium iodide | 208–210 |
| (e) 2-methyl-3-n-butyl - 4 - phenyl-1,2,3,4-tetrahydro - 1,4 - ethanoisoquinolinium chloride hemihydrate | 242–244 |
| (f) 2-benzyl - 3,4 - dimethyl-1,4-dihydro-1,4-ethano-isoquinolinium bromide | 235–237 |
| (g) 2,3-dimethyl - 1,4 - dihydro-1,4-ethano-isoquinolinium iodide | 217.5–219.5 |
| (h) 6,7-dimethoxy - 2,3 - dimethyl-4-phenyl-1,4-dihydro - 1,4 - ethano-isoquinolinium chloride monohydrate | 210–213 |
| (i) 2,3 - dimethyl-4-(4-fluoro-phenyl)-1,4-dihydro-1,4-ethano-isoquinolinium iodide | 277–278 |
| (j) 2 - benzyl - 3 - methyl-1,4-dihydro-1,4-ethano-isoquinolinium iodide | 169–170 |
| (k) 2,3-dimethyl - 4 - ethyl-1,2,3,4-tetrahydro-1,4-ethano-isoquinolinium iodide hydrate | 92–96 |
| (l) 2,3-dimethyl - 4 - benzyl-1,4-dihydro-1,4-ethano-isoquinolinium iodide | 239–249 |
| (m) 2,3-dimethyl - 4 - cyclopentyl-1,4-dihydro - 1,4 - ethano-isoquinolinium chloride monohydrate | 243–244 |
| (n) 2,3-dimethyl - 4 - cyclohexyl-methyl-1,4-dihydro - 1,4 - ethanol-isoquinolinium chloride monohydrate | 236.5–238.5 | are reduced with an excess of sodium borohydride in methanol, to yield the:

(a) 2-n-butyl-3-methyl-4-phenyl-1,2,3,4-tetrahydro-1,4-ethano-isoquinoline
(b) 2-benzyl-3-methyl-4-phenyl-1,2,3,4-tetrahydro-1,4-ethano-isoquinoline
(c) 2-(2-phenylethyl)-3-methyl-4-phenyl-1,2,3,4-tetrahydro-1,4-ethano-isoquinoline
(d) 2-allyl-3-methyl-4-phenyl-1,2,3,4-tetrahydro-1,4-ethano-isoquinoline
(e) 2-methyl-3-n-butyl-4-phenyl-1,2,3,4-tetrahydro-1,4-ethano-isoquinoline
(f) 2-benzyl-3,4-dimethyl-1,2,3,4-tetrahydro-1,4-ethano-isoquinoline
(g) 2,3-dimethyl-1,2,3,4-tetrahydro-1,4-ethano-isoquinoline
(h) 6,7-dimethoxy-2,3-dimethyl-4-phenyl-1,2,3,4-tetrahydro-1,4-ethanol-isoquinoline
(i) 2,3-dimethyl-4-(4-fluoro-phenyl)-1,2,3,4-tetrahydro-1,4-ethano-isoquinoline
(j) 2-benzyl-3-methyl-1,2,3,4-tetrahydro-1,4-ethano-isoquinoline
(k) 2,3-dimethyl-4-ethyl-1,2,3,4-tetrahydro-1,4-ethano-isoquinoline
(l) 2,3-dimethyl-4-benzyl-1,2,3,4-tetrahydro-1,4-ethano-isoquinoline
(m) 2,3-dimethyl-4-cyclopentyl-1,2,3,4-tetrahydro-1,4-ethano-isoquinoline
(n) 2,3-dimethyl-4-cyclohexylmethyl-1,2,3,4-tetrahydro-1,4-ethano-isoquinoline respectively.

I claim:

1. A member selected from the group consisting of the 1,2,3,4 - tetrahydro - 1,4 - ethano-isoquinoline having the formula

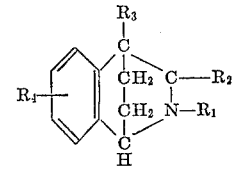

in which $R_1$ stands for hydrogen, lower alkyl, $R_4$-phenyl-lower alkyl or lower alkanoyl, $R_2$ for hydrogen, lower alkyl or $R_4$-phenyl-lower alkyl, $R_3$ for hydrogen, lower alkyl, $R_4$-phenyl-lower alkyl or $R_4$-phenyl, and $R_4$ for hydrogen, lower alkyl, lower alkoxy, halogeno, trifluoromethyl or di-lower alkylamino, each of said alkyl, alkanoyl and alkoxy containing at most one tertiary carbon atom, the N-oxide, lower alkyl quaternaries and therapeutically useful acid addition salts thereof.

2. A compound as claimed in claim 1, in which formula $R_1$ stands for hydrogen, alkyl, $R_4$-phenyl-alkyl or alkanoyl, $R_2$ for hydrogen, alkyl or $R_4$-phenyl-alkyl, $R_3$ for hydrogen, alkyl, $R_4$-phenyl-alkyl or $R_4$-phenyl, Ph for $R_4$-1,2-phenylene and $R_4$ for hydrogen, alkyl, alkoxy, halogeno, trifluoromethyl or dialkylamino, in which compounds alkyl, alkanoyl and alkoxy contain up to 4 carbon atoms and at most one tertiary carbon atom, the N-oxide, lower alkyl quaternaries and therapeutically useful acid addition salts thereof.

3. A compound as claimed in claim 1 and having the formula

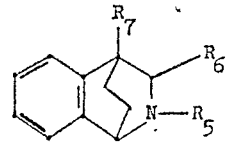

in which $R_5$ stands for hydrogen, methyl or acetyl, $R_6$ for hydrogen or methyl and $R_7$ for methyl or phenyl, their methyl quaternaries and therapeutically useful acid addition salts.

4. A compound as claimed in claim 1 and being the 3 - methyl - 4 - phenyl - 1,2,3,4 - tetrahydro - 1,4-ethano-isoquinoline or a therapeutically useful acid addition salt thereof.

5. A compound as claimed in claim 1 and being the 2,3 - dimethyl - 4 - phenyl - 1,2,3,4 - tetrahydro - 1,4-ethano-isoquinoline or a therapeutically useful acid addition salt thereof.

6. A compound as claimed in claim 1 and being the 2 - acetyl - 3 - methyl - 4 - phenyl - 1,2,3,4 - tetrahydro-1,4-ethano-isoquinoline.

7. A compound as claimed in claim 1 and being the 2 - ethyl - 3 - methyl - 4 - phenyl - 1,2,3,4 - tetrahydro-1,4-ethano-isoquinoline or a therapeutically useful acid addition salt thereof.

8. A compound as claimed in claim 1 and being the 2 - methyl - 4 - phenyl - 1,2,3,4 - tetrahydro - 1,4 - ethano-isoquinoline or a therapeutically useful acid addition salt thereof.

9. A compound as claimed in claim 1 and being the 3,4 - dimethyl - 1,2,3,4 - tetrahydro - 1,4 - ethano-isoquinoline or a therapeutically useful acid addition salt thereof.

10. A compound as claimed in claim 1 and being the 2,3,4 - trimethyl - 1,2,3,4 - tetrahydro - 1,4 - ethano-isoquinoline or a therapeutically useful acid addition salt thereof.

References Cited

UNITED STATES PATENTS 3,135,799  2/1964  Bencze _____ 260—297 X

NICHOLAS S. RIZZO, *Primary Examiner.*

D. DAUS, *Assistant Examiner.*